(12) United States Patent
Lu et al.

(10) Patent No.: US 9,601,771 B2
(45) Date of Patent: Mar. 21, 2017

(54) HIGH VOLTAGE CATHODE COMPOSITIONS FOR LITHIUM-ION BATTERIES

(71) Applicant: 3M INNOVATIVE PROPERTIES COMPANY, St. Paul, MN (US)

(72) Inventors: Zhonghua Lu, Woodbury, MN (US); Kevin W Eberman, St. Paul, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 15/223,786

(22) Filed: Jul. 29, 2016

(65) Prior Publication Data

US 2016/0336596 A1 Nov. 17, 2016

Related U.S. Application Data

(60) Continuation of application No. 14/601,579, filed on Jan. 21, 2015, which is a division of application No. (Continued)

(51) Int. Cl.

| | |
|---|---|
| *H01M 4/505* | (2010.01) |
| *H01M 4/525* | (2010.01) |
| *H01M 10/0525* | (2010.01) |
| *C01G 53/00* | (2006.01) |
| *H01M 4/131* | (2010.01) |
| *H01M 4/62* | (2006.01) |

(Continued)

(52) U.S. Cl.
CPC ............ *H01M 4/505* (2013.01); *C01G 53/50* (2013.01); *C01G 53/56* (2013.01); *H01M 4/131* (2013.01); *H01M 4/525* (2013.01); *H01M 4/623* (2013.01); *H01M 4/625* (2013.01); *H01M 4/661* (2013.01); *H01M 10/0525* (2013.01); *C01P 2006/40* (2013.01); *H01M 2004/028* (2013.01); *Y02P 70/54* (2015.11)

(58) Field of Classification Search
CPC ...................................................... H01M 4/505
See application file for complete search history.

(56) References Cited

U.S. PATENT DOCUMENTS

| | | |
|---|---|---|
| 6,660,432 B2 | 12/2003 | Paulsen |
| 2005/0112054 A1 | 5/2005 | Eberman |

(Continued)

FOREIGN PATENT DOCUMENTS

| | | |
|---|---|---|
| EP | 2399869 | 12/2011 |
| WO | WO 2002-089234 | 11/2002 |
| WO | WO 2011-136550 | 11/2011 |

OTHER PUBLICATIONS

Lee, "High capacity Li[Li0.2Ni0.2Mn0.6]O2 cathode materials via a carbonate co-precipitation method", Journal of Power Sources, 2006, vol. 162, pp. 1346-1350.

(Continued)

*Primary Examiner* — Peter F Godenschwager
(74) *Attorney, Agent, or Firm* — Adam Bramwell

(57) ABSTRACT

A lithium transition metal oxide composition. The composition has the formula $Li_a[Li_bNi_cMn_dCo_e]O_2$, where $a \geq 0.9$, $b \geq 0$, $c > 0$, $d > 0$, $e > 0$, $b+c+d+e=1$, $1.05 \leq c/d \leq 1.4$, $0.05 \leq e \leq 0.30$, $0.9 \leq (a+b)/M \leq 1.06$, and $M=c+d+e$. The composition has an O3 type structure.

5 Claims, 2 Drawing Sheets

Related U.S. Application Data

14/415,755, filed as application No. PCT/US2013/050683 on Jul. 16, 2013, now abandoned.

(60) Provisional application No. 61/787,046, filed on Mar. 15, 2013, provisional application No. 61/674,166, filed on Jul. 20, 2012.

(51) Int. Cl.
    *H01M 4/66*    (2006.01)
    *H01M 4/02*    (2006.01)

(56) References Cited

U.S. PATENT DOCUMENTS

| | | | |
|---|---|---|---|
| 2008/0280205 A1* | 11/2008 | Jiang | C01G 53/006 429/223 |
| 2011/0053003 A1 | 3/2011 | Deguchi | |
| 2011/0183209 A1 | 7/2011 | Christensen | |
| 2012/0183865 A1 | 7/2012 | Deguchi | |
| 2013/0040202 A1 | 2/2013 | Katusic | |
| 2013/0122363 A1 | 5/2013 | Chang | |

OTHER PUBLICATIONS

Lu, "Superlattice Ordering of Mn, Ni, and Co in Layered Alkali Transition Metal Oxides with P2, P3, and O3 Structures", Chem. Mater., 2000, vol. 12, No. 12, pp. 3583-3590. XP002716420.
International Search Report for PCT International Application No. PCT/US2013/050683 mailed on Jan. 17, 2014, 7 pages.

\* cited by examiner

HIGH VOLTAGE CATHODE COMPOSITIONS FOR LITHIUM-ION BATTERIES

CROSS REFERENCE TO RELATED APPLICATIONS

This application is a continuation of U.S. application Ser. No. 14/601,579, filed Jan. 21, 2015, now pending, which is a divisional of U.S. application Ser. No. 14/415,755, filed Jan. 20, 2015, now abandoned, which is a national stage filing under 35 U.S.C. 371 of PCT/US2013/050683, filed Jul. 16, 2013, which claims priority to U.S. Provisional Application No. 61/787,046, filed Mar. 15, 2013, and U.S. Provisional Application No. 61/674,166, filed Jul. 20, 2012, the disclosure of which are incorporated by reference in their entirety herein.

GOVERNMENT RIGHTS

The U.S. Government may have certain rights to this invention under the terms of Contract No. DE-EE0005499 granted by the Department of Energy.

TECHNICAL FIELD

The present disclosure relates to compositions useful as cathodes for lithium-ion batteries.

SUMMARY

Generally, the present disclosure is directed to cathode compositions, particularly O3 type structured lithium transition metal oxides including nickel (Ni), cobalt (Co), and manganese (Mn).

In some embodiments, a lithium transition metal oxide composition is provided. The composition has the formula $Li_a[Li_bNi_cMn_dCo_e]O_2$, where $a≥0.9$, $b≥0$, $c>0$, $d>0$, $e>0$, $b+c+d+e=1$, $1.05≤c/d≤1.4$, $0.05≤e≤0.30$, $0.9≤(a+b)/M≤1.06$, and $M=c+d+e$. The composition has an O3 type structure.

In some embodiments, a lithium transition metal oxide composition is provided. The composition has the formula $Li_a[Li_bNi_cMn_dCo_e]O_2$, where $a≥0.9$, $b≥0$, $c>0$, $d>0$, $e>0$, $b+c+d+e=1$, $0.5≤c/d≤0.95$, $0.0≤e≤0.30$, $1.1≤(a+b)/M≤1.4$, and $M=c+d+e$. The composition has an O3 type structure.

In various embodiments, the O3 type structured lithium transition metal oxides deliver the highest volumetric energy at 1C rate between 2.5-4.7V at 30° C.

The above summary of the present disclosure is not intended to describe each embodiment of the present disclosure. The details of one or more embodiments of the disclosure are also set forth in the description below. Other features, objects, and advantages of the invention will be apparent from the description and from the claims.

DETAILED DESCRIPTION

Figure 1:
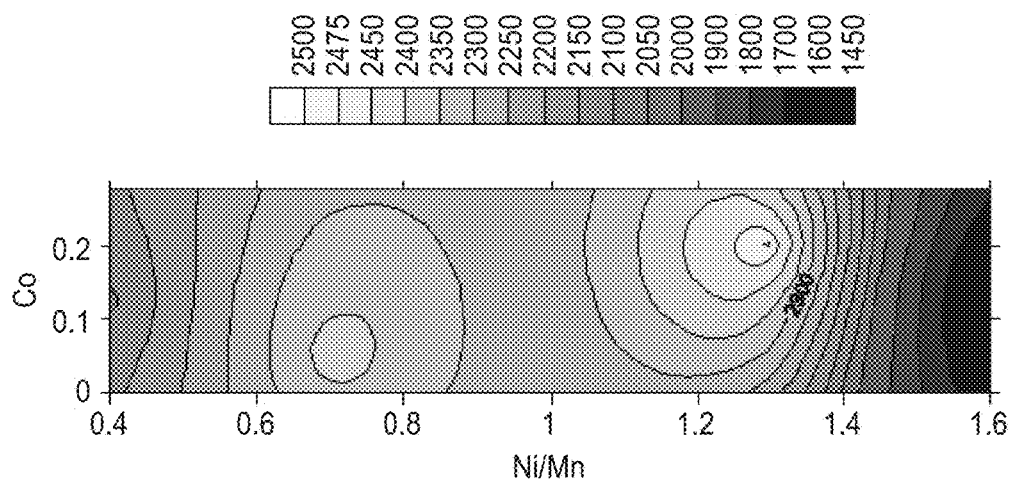
FIG. 1 is a graph of composited energy at 1C rate between 2.5-4.7V vs Li/Li+ at 30° C. vs. Co and Ni/Mn for the samples of Table 1.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

High energy lithium ion batteries require higher volumetric energy electrode materials than conventional lithium ion batteries. With the introduction of metal alloy anode materials into batteries, because such anode materials have high reversible capacity (much higher than conventional graphite), cathode materials of commensurately high capacity are desirable.

In order to obtain a higher capacity from a cathode material, cycling the cathode to a wider electrochemical window is an approach. Conventional cathodes cycle well only to 4.3V vs. Li/Li+. Cathode compositions which could cycle well to 4.7V or higher vs. Li/Li+, however, would be particularly advantageous.

Surprisingly and advantageously, it was discovered that a layered O3 type cathode containing amounts of Ni, Co, and Mn in two distinct sets of ranges exhibit high volumetric energy. This discovery was particularly surprising in view of conventional teaching in the art regarding both high energy cathode materials (e.g., 4.7V) and low energy (e.g., 4.2V) cathode materials.

A wide range of layered Ni, Mn, and/or Co oxide materials are known, but none of such materials have shown utility at high-voltage, due to capacity fade, low rate-performance, or low density.

Regarding high energy cathode materials, two compositions lacking cobalt and having more manganese than nickel (Ni/Mn<1), have been observed as favorable: (i) $Li[Li_{0.2}Ni_{0.2}Mn_{0.6}]O_2$ ("2060", Ni/Mn=0.3); and $Li[Ni_{0.5}Mn_{0.5}]O_2$ ("5050", Ni/Mn=1). *Journal of Power Sources* 162 (2006) 1346-1350. Each of these compositions, however, has drawbacks. For 2060, while high capacity has been demonstrated, it has been found to have low density and low rate-capability. For 5050, while good capacity retention has been shown, it has been found to have low rate-capability and low density, and thus low volumetric energy at useful rates. Given these drawbacks, it has been believed that a favorable high energy composition would not be found in the range 0.3<Ni/Mn<1.

Regarding lower energy cathode materials, $LiCoO_2$ has been widely used in commercial lithium ion batteries. $LiCoO_2$, however, cannot cycle well beyond 4.5V and has other drawbacks associated with Co dissolution. Other known low energy cathode materials include: (i) $Li[Ni_{0.8}Co_{0.15}Al_{0.05}]O_2$ ("NCA", Ni/Mn=infinite), (ii) $Li[Ni_{0.8}Mn_{0.1}Co_{0.1}]O_2$ ("811", Ni/Mn=8), (iii) $Li[Ni_{1/3}Mn_{1/3}Co_{1/3}]O2$ ("111" Ni/Mn=1), (iv) $Li[Ni_{0.5}Mn_{0.3}Co_{0.2}]$ O$_2$ ("532" Ni/Mn=1.66), and (v) Li[Ni$_{0.4}$Mn$_{0.4}$Co$_{0.2}$]O$_2$ ("442" Ni/Mn=1), each having a Ni/Mn ratio greater than 1. Each of these compositions has drawbacks. For NCA, capacity fade is rapid above 4.2V. For 811, capacity does not increase significantly above 4.2V. For 111, 532, and 442, the energy at high voltage is low, and each has been found to not cycle well at 4.7V vs. Li. Given these drawbacks, it has been believed that a favorable composition would not be found in the range 1<Ni/Mn<2.

Based on the performance of the aforementioned materials in high voltage applications, it is has been unclear whether a Ni, Mn, and/or Co oxide cathode material, which has utility at high voltage, could be developed.

In some embodiments, the lithium transition metal oxide compositions of the present disclosure may include Ni, Mn, and Co. The compositions may have the general formula: Li$_a$[Li$_b$Ni$_c$Mn$_d$Co$_e$]O$_2$, where a≥0.9, b≥0; c>0; d>0; e>0; and b+c+d+e=1.

In various embodiments, a lithium transition metal oxide composition has the formula Li$_a$[Li$_b$Ni$_c$Mn$_d$Co$_e$]O$_2$, where 1.05≤c/d≤1.4, 0.05≤e≤0.30, 0.9≤(a+b)/M≤1.06, and M=c+d+e. The composition may deliver composited volumetric energy higher than 2200 Wh/L within 2.5-4.7V vs. Li/Li+ at 30° C. using 1C (C=200 mAh/g) rate discharge.

In some embodiments, a lithium transition metal oxide composition has the formula Li$_a$[Li$_b$Ni$_c$Mn$_d$Co$_e$]O$_2$, where 0.5≤c/d≤0.9, 0.0<e≤0.3, 1.1≤(a+b)/M≤1.4, and M=c+d+e. The composition may deliver composited volumetric energy higher than 2200 Wh/L within 2.5-4.7V vs. Li/Li+ at 30° C. using 1C (C=200 mAh/g) rate discharge.

The compositions of the preceding embodiments may be in the form of a single phase having an O3 crystal structure. The compositions may not undergo a phase transformation to a spinel crystal structure when incorporated in a lithium-ion battery and cycled for at least 40 full charge-discharge cycles at 30° C. and a final capacity of greater than 130 mAh/g using a discharge current of 30 mA/g. The present disclosure also features lithium-ion batteries incorporating these compositions in combination with an anode and an electrolyte.

As used herein, the phrase "O3 type structure" refers to a lithium metal oxide composition having a crystal structure consisting of alternating layers of lithium atoms, transition metal atoms and oxygen atoms. Among these layered cathode materials, the transition metal atoms are located in octahedral sites between oxygen layers, making a MO2 sheet, and the MO2 sheets are separated by layers of the alkali metals such as Li. They are classified in this way: the structures of layered AxMO2 bronzes into groups (P2, O2, O6, P3, O3). The letter indicates the site coordination of the alkali metal A (prismatic (P) or octahedral (O)) and the number gives the number of MO2 sheets (M) transition metal) in the unit cell. The O3 type structure is generally described in Zhonghua Lu, R. A. Donaberger, and J. R. Dahn, Superlattice Ordering of Mn, Ni, and Co in Layered Alkali Transition Metal Oxides with P2, P3, and O3 Structures, *Chem. Mater.* 2000, 12, 3583-3590, which is incorporated by reference herein in its entirety. As an example, α-NaFeO$_2$ (R-3m) structure is an O3 type structure (super lattice ordering in the transition metal layers often reduces its symmetry group to C2/m). The terminology O3 structure is also frequently used referring to the layered oxygen structure found in LiCoO$_2$.

The compositions of the present disclosure have the formulae set forth above. The formulae themselves reflect certain criteria that have been discovered and are useful for maximizing performance. First, the compositions adopt an O3 crystal structure featuring layers generally arranged in the sequence lithium-oxygen-metal-oxygen-lithium. This crystal structure is retained when the composition is incorporated in a lithium-ion battery and cycled for at least 40 full charge-discharge cycles at 30° C. and a final capacity of above 130 mAh/g using a discharge current of 30 mA/g, rather than transforming into a spinel-type crystal structure under these conditions.

The present disclosure further relates to methods of making the above-described cathode compositions. In various embodiments, the cathode compositions of the present disclosure may be synthesized by jet milling or by combining precursors of the metal elements (e.g., hydroxides, nitrates, and the like), followed by heating to generate the cathode composition. Heating may be conducted in air at temperatures of at least about 600° C. or at least 800° C. The ability to conduct the heating process in air may be desirable because it obviates the need and associated expense of maintaining an inert atmosphere.

In some embodiments, to make a cathode from the cathode compositions of the present disclosure, the cathode composition and selected additives such as binders (e.g., polymeric binders), conductive diluents (e.g., carbon), fillers, adhesion promoters, thickening agents for coating viscosity modification such as carboxymethylcellulose or other additives known by those skilled in the art can be mixed in a suitable coating solvent such as water or N-methylpyrrolidinone (NMP) to form a coating dispersion or coating mixture. The coating dispersion or coating mixture can be mixed thoroughly and then applied to a foil current collector by any appropriate coating technique such as knife coating, notched bar coating, dip coating, spray coating, electrospray coating, or gravure coating. The current collectors can be thin foils of conductive metals such as, for example, copper, aluminum, stainless steel, or nickel foil. The slurry can be coated onto the current collector foil and then allowed to dry in air followed by drying in a heated oven, typically at about 80° C. to about 300° C. for about an hour to remove all of the solvent.

The present disclosure further relates to lithium-ion batteries. In some embodiments, the cathode compositions of the present disclosure can be combined with an anode and an electrolyte to form a lithium-ion battery. Examples of suitable anodes include lithium metal, carbonaceous materials, silicon alloy compositions, and lithium alloy compositions. Exemplary carbonaceous materials can include synthetic graphites such as mesocarbon microbeads (MCMB) (available from E-One Moli/Energy Canada Ltd., Vancouver, BC), SLP30 (available from TimCal Ltd., Bodio Switzerland), natural graphites and hard carbons. Useful anode materials can also include alloy powders or thin films. Such alloys may include electrochemically active components such as silicon, tin, aluminum, gallium, indium, lead, bismuth, and zinc and may also comprise electrochemically inactive components such as iron, cobalt, transition metal silicides and transition metal aluminides.

The lithium-ion batteries of the present disclosure can contain an electrolyte. Representative electrolytes can be in the form of a solid, liquid or gel. Exemplary solid electrolytes include polymeric media such as polyethylene oxide, polytetrafluoroethylene, polyvinylidene fluoride, fluorine-containing copolymers, polyacrylonitrile, combinations thereof and other solid media that will be familiar to those skilled in the art. Examples of liquid electrolytes include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, .gamma.-butyrolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. The electrolyte can be provided with a lithium electrolyte salt. The electrolyte can include other additives that will familiar to those skilled in the art.

In some embodiments, lithium-ion batteries of the present disclosure can be made by taking at least one each of a positive electrode and a negative electrode as described above and placing them in an electrolyte. A microporous separator, such as CELGARD 2400 microporous material, available from Celgard LLC, Charlotte, N.C., may be used to prevent the contact of the negative electrode directly with the positive electrode.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

Designed experiments covering a broad compositional space were run utilizing the following factors: (i) [Li]/[M] ratio ([Li]=1+a; [M]=b+c+d); (ii) [Co]=d; and (iii) [Ni]/[Mn]=b/c. Sintering temperatures were included as a free process factor. Each composition may have a unique optimized sintering process. All samples were made utilizing the same process.

Sample Preparation:

2M $MSO_4$ (M=Ni, Co and Mn—exact compositions are listed in Table 1) and 3.7M NaOH solution were used. First, adding 200 CC deionized (DI) water into 1000 mL beaker. While stirring the water inside the beaker, the $MSO_4$ solution was pumped into the beaker at 2.5 mL/min. In order to keep the pH of about 9.9 inside the beaker, the NaOH solution was also pumped in. In this manner, the $M(OH)_2$ was precipitated out. After two hours, the resulting precipitate was filtered, washed with 0.5M NaOH solution to reduce the sulfate impurities, then washed carefully several times using DI water, and dried at 110° C. for 10 hours to provide a dry metal hydroxide.

Aliquots (10 g) of the metal hydroxide were rigorously mixed in a mortar or blender with an appropriate amount of $Li_2CO_3$ to form $[Li_aNi_bMn_cCo_d]O2$ (a≥0; b>0; c>0; d>0 and a+b+c+d=1). The mixed powders were dried in air at 750° C. for 4 hours then at required high temperature for required hours (as shown in Table 1) to form respective single phase layered lithium metal oxide materials having O3 crystal structure. X-ray patterns of samples were collected to confirm compositions having a single phase, O3 layered structure.

Lithium metal oxide material was dispersed in N-methylpyrrolidone (NMP) solvent (from Aldrich Chemical Co.) together with Super P conductive carbon black (from MMM Carbon, Belgium) and polyvinylidine difluoride (PVDF) (from Aldrich Chemical Co.) to form a cathode dispersion composed of 90 weight percent oxide, 5 weight percent Super P and 5 weight percent of PVDF. The dispersion was coated on aluminum foil using a stainless steel coating bar, and dried at 110° C. for 4 hours to form a composite cathode coating. The active cathode loading was about 8 mg/cm². The cathode material was incorporated into 2325 coin cell half cells in a conventional manner with metallic lithium foil as the counter electrode. One layer of CELGARD 2325 microporous membrane (PP/PE/PP) (25 micron thickness, from Celgard, Charlotte, N.C.) was used to separate the cathode and Li foil. Lithium hexafluorophosphate (LiPF6), 1M in ethylene carbonate/diethyl carbonate (1:2) was used as the electrolyte. The coin cells were cycled using a Maccor series 2000 Cell cycler (available from Maccor Inc. Tulsa, Okla., USA) at a temperature of 30° C. between 2.5 V and 4.7 V vs. Li/Li+.

The true density of all the sintered oxides powders were obtained by Pentapyc 5200e automatic density analyzer (Quanta Chrome Instruments)

The composited volumetric energy of a composition, as used herein, is defined as 75% of the gravimetric energy (energy/active mass) times the true density (0.75(gravimetric energy X true density)) (maintaining a porosity of 25% in the electrode).

Table 1 lists each sample composition and sintering condition as well as the measured true densities and electrochemical performances. (1C=200 mAh/g). The energy retention (Energy vs cycle number) of each cathode for the first 40 cycles can be fitted with a linear line. The slope indicates the fading. The flatter curve indicates better fade and therefore higher slope.

For each composition (the same Ni/Mn and Co), the highest composited volumetric energy at 1C rate among the sintering conditions and Li/M ratios was selected, and its composited volumetric energy at 1C (from 4.7V to 2.5V at 30° C.) was plotted in a contour plot vs. Ni/Mn and Co using commercial Software Surfer 8 with Kriging Gridding method (from Golden Software, Inc) (shown in FIG. 1). Surprisingly, two sets of composition ranges were observed that deliver the highest volumetric energy at 1C rate between 2.5-4.7V at 30° C.: (i) (Ni/Mn~1.25; Co~0.2); and (ii) (Ni/Mn~0.7; Co~0.05).

Figure 2A:
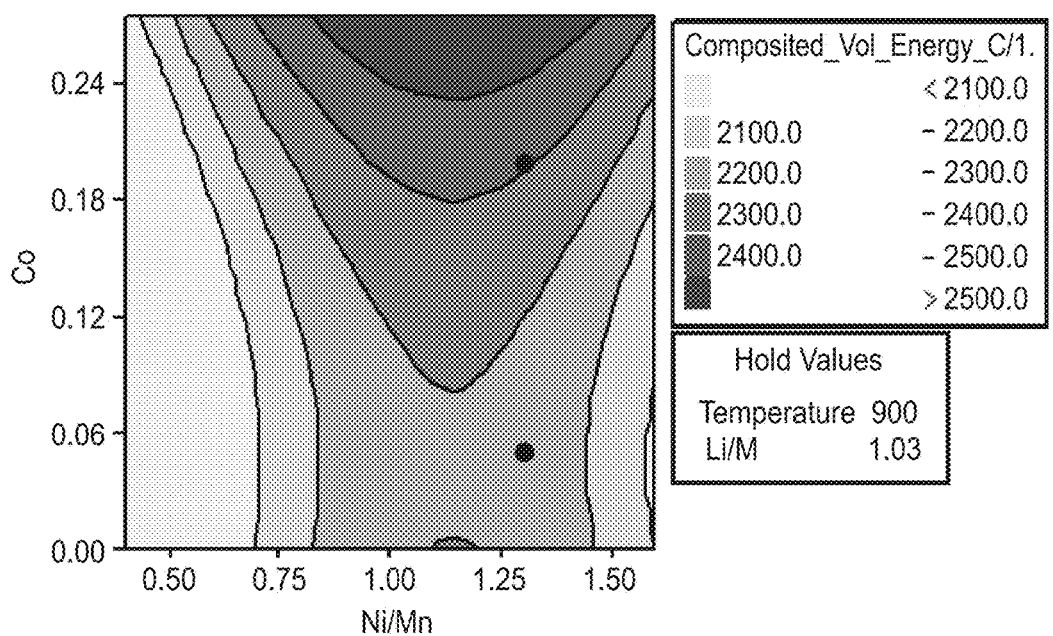
FIGS. 2A-2C are cross section contour plots of composited volumetric energy at 1C and Li/M values of 1.03, 1.115 and 1.2, respectively, vs. Co and Ni/Mn.
Figure 2B:
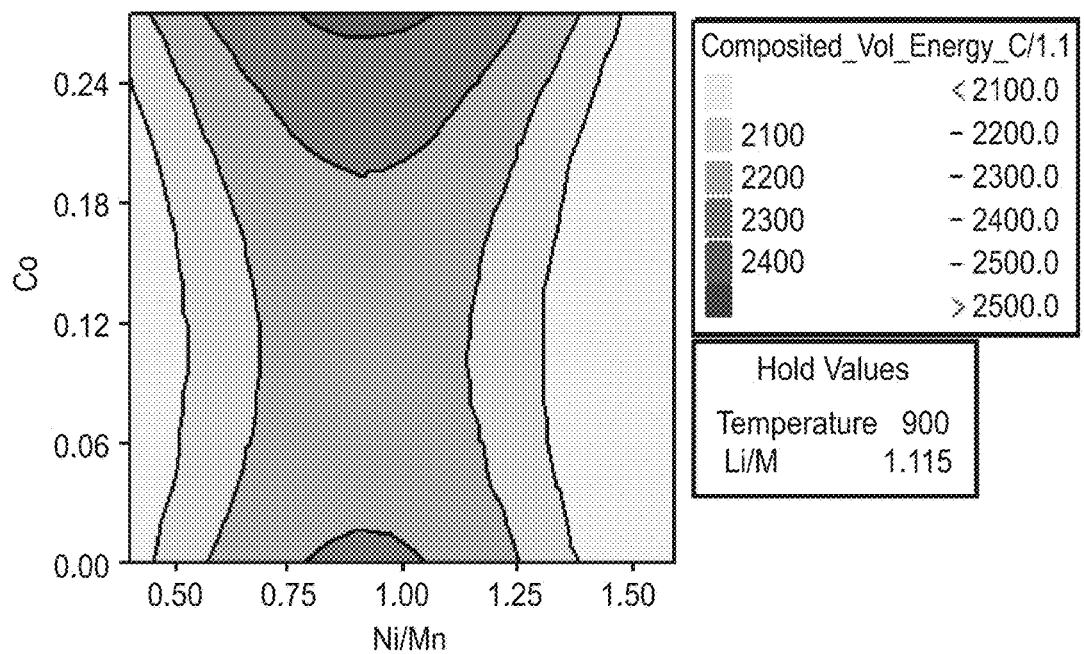
Figure 2C:
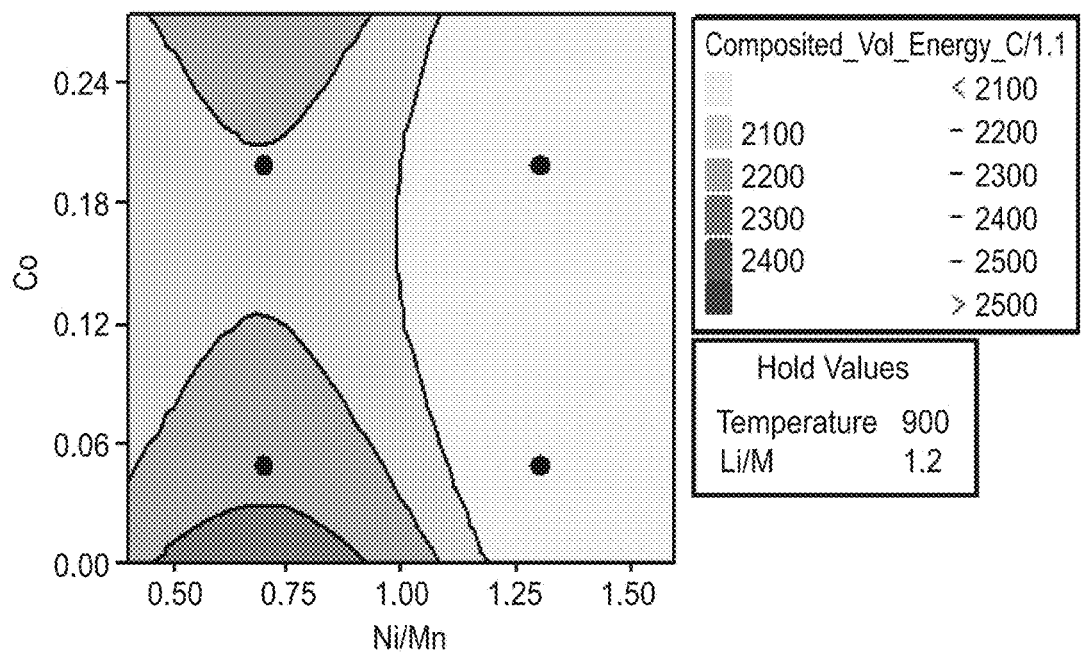

The experimental data was modeled using the commercial software MiniTab ver. 15 (from MiniTab Inc.) and the aforementioned observations were confirmed. FIG. 2 shows the predicted cross section contour plot of volumetric energy at 1C at Li/M=1.03, 1.115 and 1.2 respectively, vs. Co and Ni/Mn. From FIG. 2, it can be concluded that the maximum energy range shifts with the Li/M ratio. For cathode compositions with Ni/Mn<1, a higher Li/M ratio should be employed; while for those with Ni/Mn>1, Li/M approaches 1. This can also be observed directly in Table 1. The data indicates that there are two separate sets of composition ranges which provide the highest volumetric energy.

TABLE 1

| Oxide ID | Ni/Mn | Co | Li/M | Temperature (° C.) | Time(hrs) | True density (g/cc) | 1st Charge Capacity (mAh/g) | Irreversible capacity loss | Reversible Capacity at rate C/16 (mAh/g) |
|---|---|---|---|---|---|---|---|---|---|
| NC02009D | 0.7 | 0.05 | 1.165 | 900 | 12 | 4.50 | 265 | 0.17 | 219 |
| NC02009G | 1.3 | 0.05 | 1.03 | 900 | 12 | 4.50 | 234 | 0.10 | 210 |
| NC02009B | 0.7 | 0.2 | 1.142 | 900 | 12 | 4.57 | 263 | 0.17 | 219 |
| NC02009E | 1.3 | 0.2 | 1.03 | 900 | 12 | 4.57 | 241 | 0.12 | 212 |
| NC02011D | 0.7 | 0.05 | 1.165 | 980 | 5 | 4.47 | 257 | 0.17 | 213 |
| NC02011G | 1.3 | 0.05 | 1.03 | 980 | 5 | 4.36 | 227 | 0.14 | 195 |
| NC02011B | 0.7 | 0.2 | 1.142 | 980 | 5 | 4.42 | 265 | 0.18 | 215 |
| NC02011F | 1.3 | 0.2 | 1.03 | 980 | 5 | 4.56 | 241 | 0.15 | 203 |
| NC02009C | 0.7 | 0.05 | 1.2 | 900 | 12 | 4.50 | 272 | 0.16 | 228 |
| NC02009H | 1.3 | 0.05 | 1.2 | 900 | 12 | 4.36 | 252 | 0.23 | 195 |
| NC02009A | 0.7 | 0.2 | 1.2 | 900 | 12 | 4.43 | 273 | 0.19 | 221 |
| NC02009F | 1.3 | 0.2 | 1.2 | 900 | 12 | 4.33 | 268 | 0.28 | 194 |
| NC02011C | 0.7 | 0.05 | 1.2 | 980 | 5 | 4.41 | 269 | 0.18 | 222 |
| NC02011H | 1.3 | 0.05 | 1.2 | 980 | 5 | 4.30 | 231 | 0.29 | 165 |
| NC02011A | 0.7 | 0.2 | 1.2 | 980 | 5 | 4.51 | 272 | 0.22 | 212 |
| NC02011E | 1.3 | 0.2 | 1.2 | 980 | 5 | 4.42 | 237 | 0.35 | 155 |
| NC02010C | 1 | 0.125 | 1.115 | 940 | 7 | 4.41 | 254 | 0.16 | 213 |
| NC02010C | 1 | 0.125 | 1.115 | 940 | 7 | 4.41 | 253 | 0.16 | 214 |
| NC02010A | 0.4 | 0.125 | 1.37 | 940 | 7 | 4.33 | 296 | 0.17 | 247 |
| NC02010H | 1.6 | 0.125 | 1.115 | 940 | 7 | 4.38 | 235 | 0.27 | 171 |
| NC02010G | 1 | 0 | 1.101 | 940 | 7 | 4.43 | 244 | 0.13 | 212 |
| NC02010B | 1 | 0.275 | 1.115 | 940 | 7 | 4.58 | 248 | 0.18 | 203 |
| NC02012A | 1 | 0.125 | 1.115 | 860 | 18 | 4.45 | 255 | 0.16 | 215 |
| NC02012B | 1 | 0.125 | 1.115 | 1020 | 3 | 4.43 | 246 | 0.23 | 189 |
| NC02010D | 1 | 0.125 | 1 | 940 | 7 | 4.57 | 228 | 0.11 | 204 |
| NC02010F | 1 | 0.125 | 1.285 | 940 | 7 | 4.33 | 280 | 0.33 | 188 |

| Oxide ID | Gravimetric energy at Rate C/16 (mWh/g) | Composited Volumetric Energy at C/16 (Wh/L) | Reversivle Capacity at 1 C (mAh/g) | Gravimetric energy at Rate 1 C (mWh/g) | Composited Volumetric Energy at 1 C (Wh/L) | Slop (Wh/L * cyc) |
|---|---|---|---|---|---|---|
| NC02009D | 841 | 2841 | 181 | 656 | 2218 | −9.8 |
| NC02009G | 820 | 2768 | 180 | 679 | 2291 | −7.7 |
| NC02009B | 845 | 2897 | 182 | 677 | 2320 | −13.0 |
| NC02009E | 837 | 2867 | 188 | 724 | 2483 | −18.6 |
| NC02011D | 820 | 2751 | 185 | 681 | 2285 | −5.6 |
| NC02011G | 765 | 2503 | 162 | 617 | 2018 | −10.5 |
| NC02011B | 836 | 2770 | 182 | 690 | 2285 | −9.9 |
| NC02011F | 799 | 2734 | 167 | 634 | 2171 | −24.5 |
| NC02009C | 869 | 2935 | 193 | 703 | 2373 | −9.1 |
| NC02009H | 757 | 2477 | 157 | 595 | 1945 | −4.5 |
| NC02009A | 846 | 2814 | 182 | 673 | 2238 | −10.1 |
| NC02009F | 756 | 2456 | 152 | 574 | 1863 | −13.2 |
| NC02011C | 852 | 2820 | 188 | 691 | 2289 | −7.8 |
| NC02011H | 639 | 2062 | 119 | 446 | 1438 | −6.1 |
| NC02011A | 820 | 2775 | 169 | 637 | 2158 | −7.3 |
| NC02011E | 604 | 1999 | 119 | 447 | 1481 | −8.8 |
| NC02010C | 830 | 2745 | 178 | 665 | 2198 | −10.9 |
| NC02010C | 831 | 2748 | 177 | 660 | 2182 | −13.6 |
| NC02010A | 906 | 2945 | 181 | 644 | 2092 | −2.9 |
| NC02010H | 661 | 2170 | 121 | 450 | 1479 | −8.1 |
| NC02010G | 823 | 2733 | 182 | 680 | 2258 | −5.3 |
| NC02010B | 797 | 2738 | 171 | 660 | 2267 | −19.5 |
| NC02012A | 831 | 2772 | 179 | 662 | 2211 | −13.1 |
| NC02012B | 741 | 2462 | 148 | 567 | 1883 | −13.6 |
| NC02010D | 800 | 2740 | 175 | 661 | 2266 | −15.0 |
| NC02010F | 722 | 2349 | 137 | 518 | 1683 | −3.9 |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the numerous embodiments of the present disclosure. Thus, the appearances of the phrases such as "in one or more embodiments," "in certain embodiments," "in one embodiment" or "in an embodiment" in various places throughout this specification are not necessarily referring to the same embodiment of the numerous embodiments of the present disclosure. Furthermore, the particular features, structures, materials, or characteristics may be combined in any suitable manner in one or more embodiments.

While the specification has described in detail certain embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove.

Various exemplary embodiments have been described. These and other embodiments are within the scope of the following claims.

The invention claimed is:

1. A lithium transition metal oxide composition having the formula $Li_a[Li_bNi_cMn_dCo_e]O_2$, where $a \geq 0.9$, $b \geq 0$, $c > 0$, $d > 0$, $e > 0$, $b+c+d+e=1$, $1.05 \leq c/d \leq 1.4$, $0.05 \leq e \leq 0.30$, $1.03 \leq (a+b)/M \leq 1.06$, and $M=c+d+e$;

wherein the composition has an O3 type structure.

2. A lithium transition metal oxide composition according to claim 1, where $1.1 \leq c/d \leq 1.38$ and $0.08 \leq e \leq 0.28$.

3. A lithium transition metal oxide composition according to claim 2, where $1.2 \leq c/d \leq 1.35$ and $0.10 \leq e \leq 0.25$.

4. A lithium transition metal oxide composition according to claim 1, wherein the composition is in the form of a single phase.

5. A lithium transition metal oxide composition according to claim 1, wherein the composition delivers composited volumetric energy higher than 2200 Wh/L within 2.5-4.7V vs. Li/Li+ at 30° C. using 1C (C=200 mAh/g) rate discharge.

* * * * *